May 26, 1936.  C. W. BECK  2,041,739

STEERING WHEEL

Original Filed Feb. 6, 1928

Inventor

Charles W. Beck

Owen & Owen

By

Attorneys

Patented May 26, 1936

2,041,739

UNITED STATES PATENT OFFICE 2,041,739

STEERING WHEEL

Charles W. Beck, Toledo, Ohio, assignor, by mesne assignments, to Nellie M. Beck, Toledo, Ohio Original application February 6, 1928, Serial No. 252,251. Divided and this application January 2, 1936, Serial No. 57,230

4 Claims. (Cl. 74—552)

This invention relates to steering wheels for motor vehicles, boats and the like and has particular reference to wheels wherein a solid metallic spider consisting of a hub, spokes and rim is formed of metal and is covered with composite material such, for example, as hard rubber.

This application is a division and continuation of my co-pending application, Serial No. 252,251, filed February 6, 1928, and entitled, "Steering wheel".

Heretofore, in the manufacture of wheels formed of hard rubber, serious difficulty has been experienced in constructing a wheel having the necessary strength and durability to resist the shocks and jars incident to operation without shattering.

The primary object of the present invention is to eliminate the difficulty by forming the wheel spider of one piece of solidly reinforced metal.

Another object of the invention is to provide a wheel of the above character distinguished by the simplicity of its construction and the economical manner in which the same may be manufactured.

Figure 1:
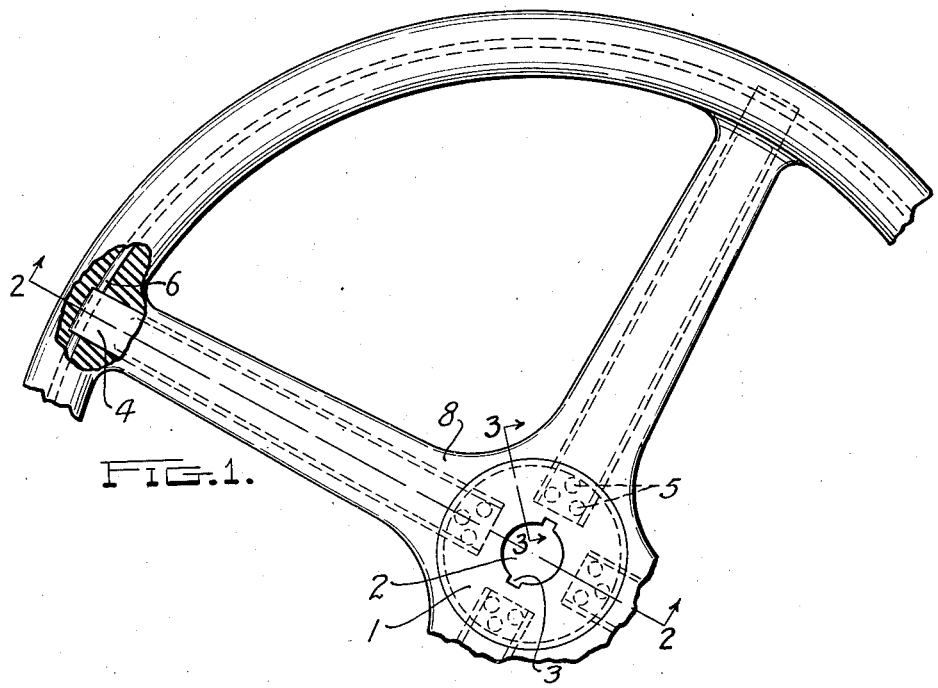
Figure 2:
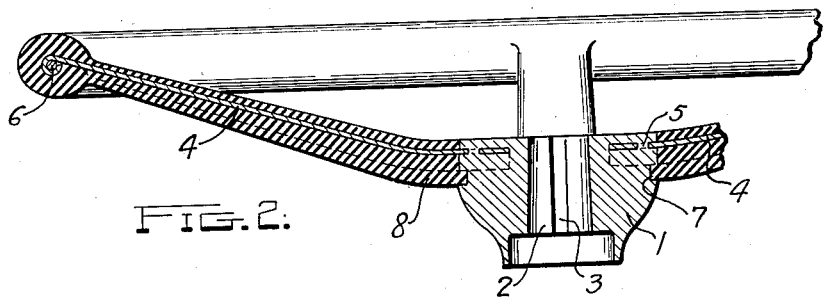
Figure 3:
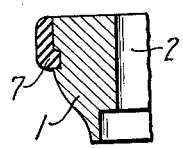

Other objects and advantages of the invention will become apparent as the description proceeds, reference being had to the accompanying drawing, in which Figure 1 is a fragmentary, plan view of a wheel embodying the present invention; Fig. 2 is a section on line 2—2 of Fig. 1; and Fig. 3 is a fragmentary section taken on line 3—3 of Fig. 1.

Referring to the drawing, the steering wheel embodying my invention is preferably formed of a steel frame covered with a suitable plastic, such as hard rubber, and comprises a hub 1 having a central tapered bore 2 adapted to receive a steering shaft of a motor vehicle and being provided with keyways 3 for such purpose. Radiating from the hub 1 are solid metallic spoke members 4. The spokes are made integral with the hub 1, in the present instance by being cast therein and for this purpose are provided with holes 5 through which the metal of the hub may flow so as to anchor the spokes firmly in the hub. The spokes may be formed of any suitable, solid metallic section and in the present instance are shown as channel shaped, since the depending flanges of the channels impart added rigidity to the spokes. It will thus be seen that the spokes extend into the hub within the periphery thereof so as to be firmly anchored.

At their outer ends the spokes are connected to a solid annular rim ring 6. The ring 6 is preferably an endless rod of circular cross-section and the spokes are fixed thereto in any suitable manner, as by crimping the spokes around the rim or by welding. In any event, it is preferred to so attach the rim 6 to the spokes as to constitute an integral connection.

In the process of construction, the solid metallic spider which consists of the hub 1, the spokes 4 and the rim 6, is placed in a suitable mold and the desired covering material such as rubber is placed into the mold embedding the spider. The covering material is then vulcanized or otherwise hardened about the spider to form a sheath 8 over the rim, spokes and hub of the wheel, so disposed that the inner end portions of the spokes 4 definitely extend across the joint formed by and between the hub 1 and the sheath or covering 8.

As shown in Fig. 1, the hub 1 is provided with an annular recess 7 into which the covering material is permitted to flow so as to firmly anchor the same against radial displacement. It will be appreciated that this feature may be omitted in some instances and the covering secured in any suitable manner.

It will be seen that a wheel construction in accordance with the present invention requires no further operations before being placed directly on the steering shaft of an automobile or similar vehicle. Further the wheel is characterized by the absence of fastening elements for the various metallic parts which are apt to work loose or shear off in case of an accident. The wheel may be made exceedingly strong by increasing the cross sectional area of the metallic section used for the spider and the strength is not impaired by the use of screws, rivets or the like.

While the invention has been disclosed in connection with a particular form and arrangement of the parts it will be appreciated that various modifications and changes may be made without departing from the invention as defined in the appended claims.

What I claim is:

1. A built-up steering wheel comprising a metallic spider consisting of a hub and separately formed spokes extending radially therefrom and being directly connected thereto, the said hub being provided with a bore whereby the same may be mounted directly on a steering shaft, a metallic reinforcing member connecting the outer ends of said spokes, and composition material embedding said reinforcing member and spokes.

2. A built-up steering wheel as set forth in claim 1 wherein the inner ends of the spokes extend into the hub.

3. A built-up steering wheel as set forth in claim 1 wherein the spokes and the covering are of solid formation in cross-section.

4. A built-up steering wheel as set forth in claim 1 wherein the composition material also covers the connections between said hub and spokes.

CHARLES W. BECK.